Dec. 22, 1925.
W. METZGER
1,566,759
LUBRICATION RETAINER FOR LEAF SPRINGS
Filed July 27, 1923
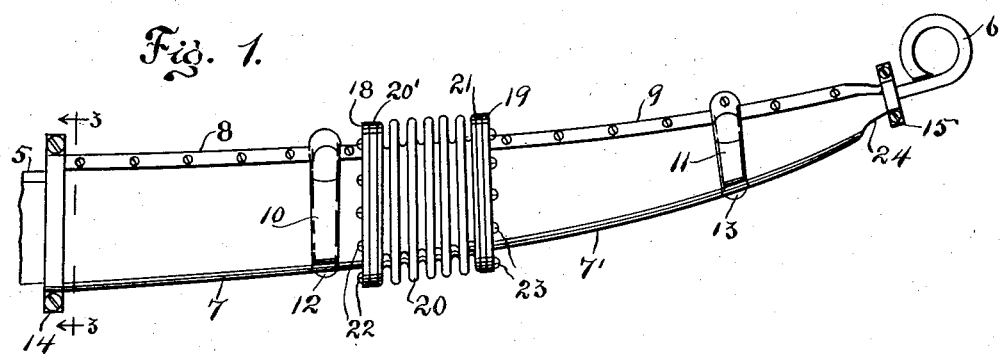
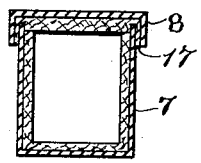
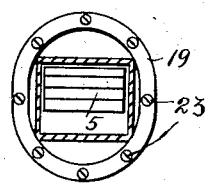
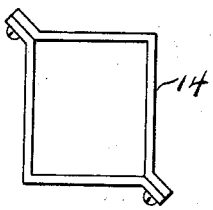
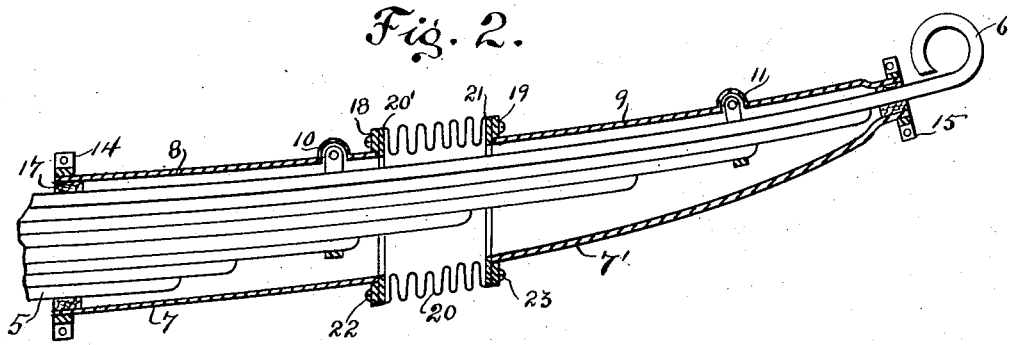
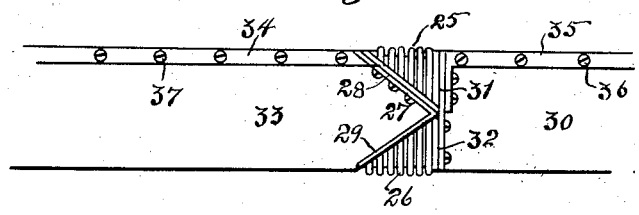
INVENTOR
William Metzger
BY
Arthur Phelps Marr
ATTORNEY Patented Dec. 22, 1925.

1,566,759

UNITED STATES PATENT OFFICE.

WILLIAM METZGER, OF NEW YORK, N. Y.

LUBRICATION RETAINER FOR LEAF SPRINGS.

Application filed July 27, 1923. Serial No. 654,114.

*To all whom it may concern:*

Be it known that I, WILLIAM METZGER, a subject of the King of Hungary, and resident of the borough of Manhattan, city, county, and State of New York, have invented new and useful Improvements in Lubrication Retainers for Leaf Springs, of which the following is the specification.

One of the acknowledged annoyances inherent in the use of leaf springs on vehicles, is the noise of and wear upon such springs, by reason of faulty lubrication.

The action of the leaves of the spring is a rubbing action of one leaf upon another and as it is at the extreme ends of the spring leaves where the greatest friction prevails, it is readily understood that this constant rubbing pushes away the oil or grease that may have been placed upon the springs.

Constant greasing of the springs is the commonly accepted method of overcoming the annoyance. This constant greasing, however, has its draw backs in that it is quite difficult and a rather tedious task to properly grease spring leaves.

The exposure of the spring allows it to accumulate dust and grit and this adds to the annoyances, by increasing friction and absorbing the grease that has been placed on the springs.

Previous attempts have been made to house leaf springs in grease retaining casings and the device here shown is designed for that purpose.

It has for its principal objects, the construction of a spring casing, simple in design, readily placed in position, one that will retain oil or grease and that will follow even the slightest movement of the spring and yet one that will be retained away from the spring and will therefore, be silent in operation.

Another object of the invention is to produce a casing for leaf springs that will be good looking and readily cleaned, thus overcoming the objections that are found in other casings.

The following is what I consider the best means of carrying out this invention and the accompanying drawing should be referred to, for a complete understanding of the specification which follows.

In the drawing:—

Fig. 1, is a side elevation of my spring lubricator.

Fig. 2, a longitudinal, sectional view thereof.

Fig. 3, a sectional view on the line 3—3 in Fig. 1, and

Fig. 4, an elevation of a clamp.

Fig. 5, is a sectional view through the casing.

Fig. 6, shows a modification, wherein the flexible member is formed in two parts.

Similar reference numerals indicate like parts in all the figures where they appear.

The spring is shown at 5 and at 6 I show an eye, formed integral with the spring and through which the ordinary toggle bolt is adapted to pass, to secure the smaller end of the spring.

It will be understood that the spring referred to, is a leaf spring having any desired number of leaves of reducing lengths and that the length of the leaves may be varied at will.

Formed of annealed metal, such as copper, is a casing of open box section. The general shape of this casing is shown at 7 in Fig. 3 and a cover formed in two parts, 8 and 9 is provided for the casing.

In the walls of the casing and in the cover, I produce outwardly extending bifurcations 10 and 11, which will fit around and yet in contact with the ordinary spring clips and a similar bifurcation or pushed-out portion 12 or 13 is provided for the spring clip bolt.

Clamps as shown at 14 and 15 and in side elevation in Fig. 4, secure the casing, just described, to the leaves of the spring and within the casing and under the clamps, I arrange packing strips 16, which may be of felt or other suitable material and which retains the oil or grease. Such a packing strip may also be introduced between the cover and the casing, as shown at 17.

It is necessary to provide means which will allow the casing to follow the movement of the spring. Such a means is here shown, at about mid-length the casing and is described as follows.

Secured to each section of the casing, which may for convenience be indicated at 7 and 7' are flanges 18 and 19 and between these flanges I arrange a cylindrically shaped, deeply corrugated, metallic member 20, sometimes referred to as a bellows or sylphon. The ends of the sylphon are secured to flanges 20' and 21, which are in turn, by means of screws 22 and 23, secured to their adjacent flanges 18 and 19, previously described.

In the operation of my device, the member 20 will provide all necessary flexibility for the movement of the spring in any direction and yet will assure that the casing be oil tight, regardless of the movement of the spring.

The outer end of the casing may be reduced as shown at 24 for appearance only. The flexible member 20 may be placed at any point in the length of the casing where it will be found convenient or most satisfactory or a plurality of these devices may be employed, but, in actual operation, I have found that the device here shown operates entirely satisfactorily and for that reason, I prefer this construction.

At Fig. 5, I show a modification, the object of which is to allow the casing to be placed in position without removing the shackle bolt of the spring. In this construction, the flexible member is formed in two parts as shown at 25 and 26. One part of the casing is V-shaped as shown at 27 and flanges 28 and 29 are provided for securing the flexible member to this part of the casing.

The other casing member 30, is also provided with flanges 31 and 32, which allows the part 30 of the casing, to be secured to the part 33. The cover members are shown at 34 and 35, each secured by means of screws 36 and 37 and should also be secured to the flanges 28 and 31 as shown, so that the device may be oil tight.

Other modifications may be made within the scope of the appended claims, without departing from the principle or sacrificing the advantages of the invention.

Having carefully and fully described my invention, what I claim and desire to obtain is:—

1. A lubrication retainer for leaf springs comprising a casing, projections therein, for the reception of the spring clips and a flexible member formed from a continuous piece of metal and at approximately mid-length said casing, to allow said casing to follow the movement of the spring.

2. A device of the character described comprising a casing adapted to enclose a spring, a cover for said casing, flexible means in said casing and between the ends thereof and securing means for the ends of said casing and fibrous means under said securing means for retaining the lubricant in the casing.

Signed at the city, county and State of New York, this 20th day of July, 1923.

WILLIAM METZGER.